United States Patent [19]

Shiga et al.

[11] 4,367,322

[45] Jan. 4, 1983

[54] PROCESS FOR PRODUCING PROPYLENE COPOLYMER

[75] Inventors: Akinobu Shiga; Kiyoshi Matsuyama; Masahiro Kakugo; Yukio Naito; Akira Nunose, all of Niihama; Masaharu Nishioka, Ibaraki, all of Japan

[73] Assignee: Sumitomo Chemical Company, Ltd., Osaka, Japan

[21] Appl. No.: 291,701

[22] Filed: Aug. 10, 1981

Related U.S. Application Data

[63] Continuation of Ser. No. 108,092, Dec. 28, 1979, abandoned.

[30] Foreign Application Priority Data

Dec. 28, 1978 [JP] Japan .............................. 53-163010
Jan. 18, 1979 [JP] Japan .................................. 54-5437

[51] Int. Cl.$^3$ .............................................. C08F 4/64
[52] U.S. Cl. ................................ 526/137; 252/429 B; 526/139; 526/140; 526/348; 526/348.6; 526/916
[58] Field of Search ................ 526/137, 142, 139, 140

[56] References Cited

U.S. PATENT DOCUMENTS

| | | | |
|---|---|---|---|
| 3,960,765 | 6/1976 | Shiga et al. | 526/142 |
| 4,053,697 | 10/1977 | Asada et al. | 526/142 |
| 4,123,387 | 10/1978 | Shiga et al. | 526/142 |
| 4,151,111 | 4/1979 | Yokoyama et al. | 526/142 |
| 4,165,298 | 8/1979 | Shiga et al. | 526/142 |
| 4,182,852 | 1/1980 | Shiga et al. | 526/142 |
| 4,246,135 | 1/1981 | Shiga et al. | 526/142 |

Primary Examiner—Stanford M. Levin
Attorney, Agent, or Firm—Sughrue, Mion, Zinn, MacPeak and Seas

[57] ABSTRACT

In a process for producing propylene copolymer containing about 80 to 99 mol % propylene and about 1 to 20 mol % ethylene and/or an α-olefin having 4 to 18 carbon atoms using a Ziegler-Natta catalyst, the improvement which comprises said Ziegler-Natta catalyst comprising:

(A) titanium trichloride prepared by reducing titanium tetrachloride with an organoaluminum compound and activating the product; and (B) an organoaluminum compound;

with the molar ratio of (B)/(A) being about 20 to 100.

11 Claims, 1 Drawing Figure

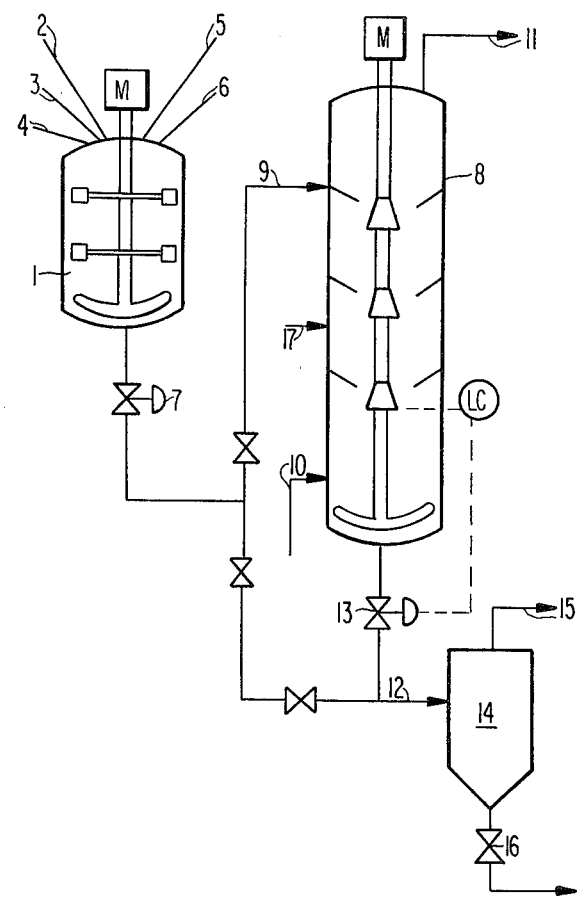

PROCESS FOR PRODUCING PROPYLENE COPOLYMER

This is a continuation of application Ser. No. 108,092 filed Dec. 28, 1979, now abandoned.

BACKGROUND OF THE INVENTION

1. Field of the Invention

This invention relates to an industrially advantageous process for producing a propylene copolymer with high quality. More particularly, it is concerned with an industrially advantageous process for producing a propylene copolymer excellent in film transparency, stiffness, blocking properties, heat-sealing properties, etc., by using a particular Ziegler-Natta catalyst with a particular composition.

2. Description of the Prior Art

Isotactic polypropylene produced using a stereoregular catalyst is widely used for various moldings due to its excellent stiffness, strength, molding properties, appearance, and heat resistance. Polypropylene films are popularly used as various wrapping materials as a result of their highly valued transparency and firmness. However, these polypropylenes suffer from several disadvantages. One defect is their largely temperature-dependent impact strength. Their so-called freeze resistance is poor. That is, impact strength is sharply reduced between room temperature and 0° C. Another defect is their high heat-sealing temperature. Using a biaxially oriented film, for example, the temperature required to obtain a sufficient heat-sealing strength is so high, it spoils the film appearance. As a result, heat-sealing such films is in most cases impossible.

In order to overcome these problems, random copolymers containing a small amount of α-olefin such as ethylene or butene-1 (e.g., propylene-ethylene copolymer, propylene-butene-1 copolymer, propylene-ethylene-butene-1 copolymer, etc.) have been used alone or as blends with other resins or rubbers, as heat-sealing layers of biaxially oriented polypropylene films, shrink packaging films, freeze-resistant films, etc. However, there are several problems with the production and quality of these copolymers. With respect to production, worthless noncrystalline polymers soluble in a polymerization medium are produced as a by-product in larger amounts than in the production of polypropylene, which results in a loss of monomers. These by-products are an economic disadvantage and create troubles in producing the copolymer. For example, an increase in stirring force due to an increase in the slurry viscosity is required, a reduction in heat transmission of a polymerization reactor results, and the like. Such phenomena become more serious when the content of the comonomer (e.g., ethylene, butene-1, etc.) in the copolymer increases to produce a copolymer having more excellent freeze resistance and heat-sealing properties.

On the other hand, with respect to their physical properties, the copolymers have a generally poorer blocking slip of film as compared with polypropylene, and are liable to lose their transparency with time. Such defects partly result from the poorer stiffness thereof as compared with polypropylene but are mainly the result of the high contents of low molecular weight non-crystalline polymers in the copolymer.

The above-described problems in production and quality are generally so related that an improvement in one results in a deterioration of the other. For example, as disclosed in Japanese Patent Publication No. 4992/69, a process comprising copolymerizing after forming a small amount of polypropylene using a titanium trichloride catalyst results in an increase in the content of the low molecular weight non-crystalline polymers contained in the copolymer, which does not improve quality. On the other hand, the amounts of worthless non-crystalline polymers soluble in a polymerization medium in the copolymer decrease. The use of a polymerization medium with more solvent power to reduce the content of low molecular weight non-crystalline polymers in the copolymer results in an increase of the amount of non-crystalline polymers dissolved in the polymerization medium. In some cases, this reduces the polymerization temperature which in turn reduces the polymerization activity of the catalyst. In this case to achieve the same polymerization amount in a given amount of time results in an increased amount of catalyst residue remaining in the copolymer, which leads to deterioration of heat stability and hue. Prolonged polymerization leads to a serious reduction in productivity.

On the other hand, turning to the catalyst, those catalysts which have generally been used for producing polypropylene comprise titanium trichloride and an organoaluminum compound such as diethylaluminum chloride. In these catalysts, the molar ratio of titanium trichloride to the organoaluminum compound has been 1:1 to 20 (see *Polypropylene Resin*, p. 26 (published by Nikkan Kogyo Shinbun Sha)). This is because catalytic activity and stereoregularity (indicated in terms of n-heptane insolubles or crystallinity) sharply decrease as the Al/Ti molar ratio in the catalyst components becomes less than 1, whereas catalytic activity and stereoregularity decrease when the Al/Ti molar ratio exceeds about 10. This is reported in various publications such as L. Reich and A. Schindler, *Polymerization by Organometallic Compounds*, Chapter III D (published by Interscience Publishers), T. Keii, *Kinetics of Ziegler-Natta Polymerization*, Chapter 4.2 (published by Kodansha), and the citations given therein and Japanese Patent Application (OPI) No. 34478/72 (The term "OPI" as used herein refers to a "published unexamined Japanese patent application").

In the production of propylene copolymers, too, it is disclosed, for example, in Japanese Patent Application (OPI) No. 35487/74, that the molar ratio of an organoaluminum compound (B) to a titanium compound (A) [(B)/(A)] is about 0.5 to 20, preferably 1 to 10. Thus, it has been common knowledge to use catalysts with a (B)/(A) molar ratio within the above-described range.

However, the above-described processes still do not solve the aforesaid problems in the production of propylene copolymers containing about 80 to 99 mol% propylene and 1 to 20 mol% ethylene and/or an α-olefin having 4 to 18 carbon atoms, which are the end products of the present invention.

SUMMARY OF THE INVENTION

As a result of various investigations to solve the aforesaid problems with respect to the production and the quality of propylene copolymers it has been found that the problems with respect to both production and quality are simultaneously solved using a Ziegler-Natta catalyst having a novel composition.

One object of the present invention is to provide a process for producing a propylene copolymer having a good quality with a high productivity.

Another object of the present invention is to provide a process for producing propylene copolymers with reduced amounts of non-crystalline polymer by-product.

Still another object of the present invention is to provide a process for producing propylene copolymers having improved freeze resistance and heat-sealing properties.

A further object of the present invention is to provide a process for producing propylene copolymers which are more stable in terms of their transparency and color hue such that these properties are not as easily heat deteriorated or lost with time.

According to the present invention, there is provided a process for producing a propylene copolymer containing about 80 to 99 mol% propylene and 1 to 20 mol% ethylene and/or an α-olefin having 4 to 18 carbon atoms using a Ziegler-Natta catalyst comprising:
(A) titanium trichloride prepared by reducinhg titanium tetrachloride with an organoaluminum compound and activating the product; and
(B) an organoaluminum compound
with the molar ratio of (B)/(A) being about 20 to 100.

BRIEF DESCRIPTION OF THE DRAWING

The FIGURE is a schematic flow diagram showing one embodiment of the present invention.

DETAILED DESCRIPTION OF THE INVENTION

Titanium trichloride used in the present invention as catalyst component (A) is obtained by reducing titanium tetrachloride with an organoaluminum compound and reacting the reduced solid with a complexing agent and a halogen compound simultaneously or successively.

The organoaluminum compound used for the reduction of titanium tetrachloride is represented by the formula:

$$AlR_lX_{3-l}$$

wherein R represents a straight chain, branched chain or cyclic alkyl group or aryl group having up to 18 carbon atoms and X represents a halogen atom or hydrogen atom and $l$ is a number $1 \leq l \leq 3$. Examples of these organoaluminum compounds include methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide and diethyl aluminum iodide.

Of the above compounds, diethyl aluminum chloride and ethyl aluminum sesquichloride provide especially preferred results.

The reduction reaction is carried out at about −60° C. to about 60° C., preferably −30° C. to 30° C. There is no particular restriction on the reaction time, but the reaction time usually ranges from about 1 to about 10 hours. In order to complete the reduction of titanium tetrachloride to titanium trichloride, an after-reaction at an elevated temperature not exceeding about 150° C. is preferably performed. Preferably the reduction reaction is carried out in an inert hydrocarbon solvent such as pentane, hexane, heptane, octane or decane. The reduced product may optionally be heat-treated in the presence or absence of an inert hydrocarbon solvent. A suitable heat-treatment temperature is about 100° to about 180° C. There is no particular restriction on the heat-treatment time, but usually periods of 30 minutes to 5 hours are convenient.

A preferred complexing agent is an ether compound of the formula:

$$R^1-O-R^2$$

wherein $R^1$ and $R_2$ are each a straight chain, branched chain or cyclic alkyl group having 1 to 10 carbon atoms. Representative ethers include diethyl ether, di-n-propyl ether, diisopropyl ether, di-n-butyl ether, diisoamyl ether, dineopentyl ether, di-n-hexyl ether, methyl n-butyl ether, methyl isoamyl ether, ethyl isobutyl ether, etc. Of these ether compounds, di-n-butyl ether and diisoamyl ether give especially preferred results.

The reaction of the reduction product with the either compound is advantageously carried out in the presence of a diluent. Suitable diluents which can be used are inert hydrocarbons such as hexane, heptane, octane, decane, decalin, benzene, toluene and xylene.

In the present invention, the either compound may be added to titanium tetrachloride prior to the reduction, to the reaction mixture during the reduction reaction, to the reduction solid or a halogen compound-treated solid as it is or diluted with an inert hydrocarbon solvent.

The amount of the ether compound used is about 0.05 to about 3.0 mols, preferably 0.5 to 1.5 mols, per mol of titanium trichloride. The reaction temperature is desirably about 0° to about 150° C. There is no particular limitation on the treatment time, but periods of about 20 minutes to about 5 hours are used conveniently.

Preferred halogen compounds are:
(i) halogen or interhalogen compounds of the formula:

$$X^1X^2_a$$

wherein $X^1$ and $X^2$ are each a chlorine, bromine or iodine atom and a is a number from 1 to 3;
(ii) titanium halides;
(iii) alkylaluminum halides of the formula:

$$AlR^3_nX^3_{3-n}$$

wherein $R^3$ is an alkyl group having 1 to 18 carbon atoms, $X^3$ is a chlorine, bromine or iodine atom and n is a number satisfying the relationship $1 \leq n < 1.5$; and
(iv) organic halogen compounds.

As specific examples of the halogen or interhalogen compounds, chlorine, bromine, iodine, bromine chloride, iodine chloride, iodine trichloride, iodine bromide, etc., are illustrative. Of these compounds, iodine is particularly preferred.

As titanium halides, there are titanium tetrachloride, titanium tetrabromide, titanium tetraiodide and mixtures thereof. Of these compounds, titanium tetrachloride is particularly preferred.

As alkylaluminum halides, ethylaluminum dichloride is commonly used.

As organic halogen compounds, those having 1 to 18 carbon atoms and 1 to 38 halogen atoms are preferred. Specifically, there are halogen-substituted alkanes such as carbon tetrachloride, chloroform, hexachloroethane, ethyl iodide, butyl iodide and the like.

Desirably, the reaction with the halogen compound is carried out in an inert hydrocarbon solvent such as hexane, heptane, octane, decane, benzene, toluene or xylene.

The treatment may be carried out using various procedures, for example, (i) the ether-treated solid may be reacted with the halogen compound, (ii) the reduced solid may be reacted with the halogen compound and then reacted with the ether, (iii) the reduced product may be reacted with a mixture of the ether compound and the halogen compound, and (iv) the halogen compound may be added to the reduced reaction mixture obtained by reducing titanium tetrachloride with the organoaluminum compound in the presence of the ether compound. The catalytic activity of solid catalyst varies depending on the type of the halogen compound used and reaction procedures. When a halogen, an interhalogen compound or an organic halogen compound as the halogen compound is used procedures (i) to (iv) may be adopted, but when the titanium halide or alkylaluminum halide is used procedures (i) to (iii) should be adopted. Accordingly, the required solid catalyst can be easily prepared by selecting the appropriate halogen compound and procedure.

The amount of the halogen or halogen compound used is usually about 0.001 to about 2.0 mols, preferably 0.005 to 1.0 mol, more preferably 0.03 to 0.5 mol, per mol of titanium trichloride, but not limited thereto. The reaction temperature can be optionally chosen, but is preferably from about −30° C. to about 200° C., more preferably from 0° C. to 150° C., most preferably 0° C. to 100° C.

The reaction time is also not particularly restricted, but usually periods of from about 5 minutes to about 5 hours are conveniently used.

As specific examples of preferred titanium trichloride, there may be given titanium trichloride disclosed in (1) Japanese Patent Application (OPI) No. 74595/1975 and U.S. Pat. No. 3,960,765, (2) U.S. Pat. No. 4,123,387 and (3) Japanese Patent Application (OPI) Nos. 33289/1978 and 51285/1978. Titanium trichloride in (1) is produced by reducing titanium tetrachloride with an organoaluminum compound, followed by reaction with a complexing agent and an alkylaluminum dihalide in this order and then optionally with a complexing agent. Titanium trichloride in (2) is produced by reducing titanium tetrachloride with an organoaluminum compound, followed by reaction with a mixture of carbon tetrachloride and an ether. Titanium trichloride in (3) is produced by reducing titanium tetrachloride with an organoaluminum compound, followed by reaction with a mixture of an ether and a halogen or interhalogen compound or monohalogenated hydrocarbon.

Also, the titanium trichlorides disclosed in (4) British Pat. No. 1,391,068, (5) Japanese Patent Application (OPI) No. 46598/1976 and (6) U.S. Patent Application Ser. No. 920,888 (filed June 30, 1978), now abandoned and refiled as continuation-in-part application Ser. No. 041,972, May 23, 1979, U.S. Pat. No. 4,246,135 can be used preferably.

Titanium trichloride in (4) is produced by reducing titanium tetrachloride with an organoaluminum compound, followed by treatment with a complexing agent and titanium tetrachloride in this order. Titanium trichloride in (5) is produced by reducing titanium tetrachloride with an organoaluminum compound in the presence of an ether and an iodine or an iodine compound, followed by contact with a releasing agent (Lewis acid). Titanium trichloride in (6) is produced by reducing titanium tetrachloride with an organoaluminum compound in the presence of an ether, followed by reaction with iodine.

The organoaluminum compounds preferably used in the present invention as component (B) are represented by the formula:

$$AlR^4{}_{3-m}X^4{}_m$$

wherein $R^4$ is an alkyl group having 1 to 18 carbon atoms, $X^4$ is a hydrogen, chlorine, bromine or iodine atom or an alkoxy group having 1 to 8 carbon atoms and $m$ is a number satisfying the relation $0 \leq m < 3$. There are illustrated, for example, trialkylaluminum, alkylaluminum halide, alkylaluminum hydride, alkylaluminum alkoxide, alkylaluminum alkoxyhalide, etc. Of these, preferred compounds are dimethylaluminum chloride, diethylaluminum chloride, diisobutylaluminum chloride, diethylaluminum bromide, diethylaluminum iodide, ethylaluminum sesquichloride, a mixture of triethylaluminum and diethylaluminum, a mixture of triethylaluminum and aluminum chloride, with diethylaluminum chloride being particularly preferred.

In the present invention, the molar ratio of catalyst component (B) to catalyst component (A) [(B)/(A)] is important and within the range of 20/1 to 100/1, preferably 30/1 to 70/1. When the ratio is outside this range, the amounts of worthless non-crystalline copolymers soluble in a polymerization medium and the amounts of low molecular weight non-crystalline polymers contained in the resulting copolymer do not decrease, and thus the effects of the present invention cannot be attained as will be demonstrated in Examples and Comparative Examples to be described hereinafter.

The catalyst used in the present invention essentially contains the above-described two components with the aforesaid specified ratio and, in addition, it can contain a known electron donor as a third component. As such third component, electron donors containing an oxygen atom, nitrogen atom, sulfur atom, or phosphorus atom are popular and, as is well known, aromatic compounds can also be used. To illustrate specific examples thereof, there are saturated or unsaturated aliphatic, alicyclic, or aromatic esters such as ethyl acetate, methyl methacrylate, ethyl benzoate, ε-caprolactone, etc.; ethers such as dibutyl ether, tetrahydrofuran, etc.; organic sulfur-containing compounds such as butyl thioether, thiophenol, etc.; amines such as triethylamine, etc.; organic phosphorus compounds such as tri-n-butylphosphine, triphenyl phosphite, tri-n-butyl phosphite, tri-n-butyl phosphate, hexamethylphosphoramide, etc.; aromatic compounds such as benzene, toluene, azulene, etc.; and the like. These may be used in combinations of two or more of them.

Since the effects of the electron donor vary depending upon its nature, the molar ratio of the electron donor to the aforesaid two catalyst components is properly selected for each of them taking into account the acceptable degree of decrease in catalytic activity and the amount of resulting atactic polymer but, in general, the electron donor is used in a molar ratio of about 0.01 to 100 based on catalyst component (A).

In supplying catalyst components (A) and (B), or (A), (B) and the electron donor to a polymerization vessel, they may be supplied separately or as a mixture of two or three components.

The process of the present invention is applied to the production of copolymers containing about 80 to 99 mol% propylene and 1 to 20 mol% ethylene and/or an α-olefin having 4 to 18 carbon atoms, preferably 85 to 97.5 mol% propylene and 2.5 to 15 mol% ethylene and/or an α-olefin having 4 to 18 carbon atoms. When the propylene content is greater than the above-described range, the effects of the present invention are not remarkable. While, when less than that, the industrial production of copolymers becomes difficult due to an increase of non-crystalline polymers soluble in a polymerization medium.

Monomers fed into a polymerization system are propylene, ethylene, and/or α-olefin having 4 to 18 carbon atoms. As the α-olefin, butene-1, pentene-1, 3-methylpentene-1, 4-methylpentene-1, octene-1, decene-1, dodecene-1, tetradecene-1, hexadecene-1, octadecene-1, and a mixture of two or more of these may be used. Of these, butene-1 is particularly preferred. As the preferred examples of copolymers, there may be illustrated propylene-ethylene copolymer, propylene-butene-1 copolymer, propylene-ethylene-butene-1 copolymer, etc.

The molar ratio of monomers fed into a polymerization system should be selected so as to obtain the copolymer with desired composition taking into consideration the reactivity ratio of monomers, which can be determined in a well known manner, by the production conditions (temperature, pressure, kind of polymerization medium, catalyst, etc.).

The polymerization is conducted in an inert organic solvent such as an aliphatic hydrocarbon (e.g., butane, pentane, hexane, heptane, or the like), an alicyclic hydrocarbon (e.g., cyclohexane, methylcyclohexane, or the like), or an aromatic hydrocarbon (e.g., benzene, toluene, or the like), in liquid phase monomers containing substantially no inert organic solvents, or in gas phase monomers.

Polymerization temperatures are about 0° to 200° C., preferably about 30° to 100° C., more preferably about 40° to 80° C. Polymerization pressure is not limited, for example, atmospheric pressure to 100 kg/cm², which can be optionally selected depending upon polymerizing manner.

The molecular weight of the resulting copolymer can be controlled by using various molecular weight regulating agents, and the use of hydrogen as the regulating agent is popular.

Polymerization can be conducted continuously or batchwise. The polymerization time or the average residence time in a polymerization vessel is optional but for economy it is desirable to adjust the reaction conditions to provide a polymerization time or average residence time producing copolymer in an amount of not less than 8,000 parts by weight per part by weight of catalyst component (A), thereby to substantially eliminate or simplify the step of removing the catalyst residue.

Copolymers obtained by the polymerization are then subjected to a conventional after-treatments and put into practical use.

In a preferred embodiment of the present invention propylene, ethylene, and/or $C_4$-$C_{18}$ α-olefin are copolymerized in a liquid phase medium having a solubility parameter, δ, of not more than 7.0 (cal/cc)$^{\frac{1}{2}}$, introducing the withdrawn polymerization slurry into an upper part of a counter current type washing tower (hereafter upper feed), contacting the slurry in a counter current manner with a liquid phase medium described below having δ of not more than 7.0 (cal/cc)$^{\frac{1}{2}}$ fed through a lower part of the tower (hereafter lower feed) thereby to wash the slurry. The solubility parameter δ is defined in J. H. Hildebrand, *The Solubility of Non-Electrolytes*, Reinhold Publishing Corporation (1950) as follows:

$$\delta = (\Delta E/V)^{\frac{1}{2}}$$

wherein ΔE is evaporation energy and V is molar volume. This process can provide propylene copolymers having highly satisfactory heat-sealing properties, freeze resistance, transparency, slip properties, blocking properties, etc., when formed into a film without spoiling the economical and industrial advantages of bulk polymerization. The composition of copolymer suited for this process can be as described above but is preferably about 80 to 99 wt% propylene, 0.5 to 5 wt% ethylene, and 0.5 to 15 wt% butene-1, and most preferably about 86 to 98 wt% propylene, 1 to 4 wt% ethylene, and 1 to 10 wt% butene-1. Particularly remarkable effects can be obtained with the above-described ternary copolymer, and copolymers providing films having good heat-sealing property, freeze resistance, transparency, slipperiness, and anti-blocking property can be obtained.

Further, the weight ratio of ethylene to butene-1 in the copolymer is about 1:30 to 10:1, preferably about 1:10 to 4:1, more preferably about 1:5 to 3:1.

The lower feed preferably has a solubility parameter δ of not more than 7.0 (cal/cc)$^{\frac{1}{2}}$. To specifically illustrate such liquid phase medium, there are n-propane, n-butane, isobutane, isopentane, propylene, butene-1, cis- and trans-butene-2, isobutylene, etc., and the mixtures thereof. In addition, a mixture of these and a small amount of a solvent with a large δ such as hexane, heptane, toluene, or the like can also be preferably used as long as δ of the mixture is not more than 7.0 (cal/cc)$^{\frac{1}{2}}$.

The liquid phase medium used in the polymerization system and the lower feed may be the same or different or a mixture of the two. Particularly preferred liquid phase media are substantially inert solvent-free monomer, i.e., propylene or butene-1.

Polymerization conditions for the liquid phase monomers such as propylene, butene-1, etc., are properly selected with respect to the pressure and temperature of the polymerization system, the catalyst system, the concentrations of the molecular weight modifier and stabilizer, the stirring conditions, the cooling and heating conditions, etc. The conditions are selected such that, as is commonly known, the monomer mixture exists as a liquid phase, taking into consideration the characteristics of the polymerization system (for example, polymerization rate, polymerization time, residence time, etc.) and the characteristics of resulting copolymer (for example, composition, melt viscosity, cold xylene-solubles, etc.).

The FIGURE is a schematic view showing one embodiment of the process of the present invention. Liquid phase propylene, ethylene, and butene-1 are fed into polymerization tank 1 via lines 2, 3, and 4, respectively, a molecular weight modifier like hydrogen via line 5, and the catalyst via line 6. In the case of using an inert solvent such as propane or butane, it is fed via another line or via line 2 as a mixture with liquid phase propylene.

The polymerization reaction is allowed to proceed at a pressure at which the monomer mixture or the mixture of monomers and the inert solvent such as propane or butane are maintained in a liquid state. The thus formed polymerization slurry is withdrawn from the polymerization tank 1 continuously or batchwise, preferably continuously, via valve 7, and fed to the upper portion 9 of counter current washing tower 8 (upper feed). A liquid phase medium having δ of not more than 7.0 (cal/cc)$^{\frac{1}{2}}$ and not containing polymers (mainly non-crystalline polymers) soluble in the polymerization slurry is fed into the washing tower 8 through a lower portion thereof (lower feed).

Polymers soluble in the polymerization slurry and the catalyst remaining in the slurry are selectively discharged through upper over-flow line 11 and introduced into an apparatus for recovering non-crystalline polymers. The polymerization slurry is contacted with the liquid lower feed in washing tower 8, and polymers insoluble in the polymerization slurry are selectively withdrawn via lower line 12, with the pressure being reduced to about atmospheric pressure by valve 13 interlocked with a level (or concentration) controller, LC, for the slurry depositing on the tower bottom, and introduced into flash tank 14.

Monomers volatile under ordinary pressure are vaporized in flash tank 14 and discharged via line 15 to a purifying step. On the other hand, polymers separated in flash tank 14 are transferred to a hopper or a pelletizer via valve 16 directly or, if necessary, after an after-treatment such as a catalyst-decomposing step.

One function of the counter current washing tower in the process of the present invention is to separate the liquid medium in the upper feet and discharge the liquid medium together with the lower feed rising from the lower part of the tower via the over-flow line at the tower top. Another function is to wash insoluble polymers in the upper feed with the lower feed and discharge the soluble (non-crystalline) polymer through the tower bottom together with part of lower feed.

Conventional counter current washing towers can be employed. For example, that shown in Japanese Patent Application (OPI) No. 139886/76 can suitably be used.

Comparative Examples and Examples will be described below for further understanding of the process of the present invention. However, the present invention is not limited thereto. Additionally, the characteristic values in the Examples are those measured by the following methods.

(1) Melt Index (MI):
 Measured according to JIS K6758.
(2) Heat-Sealing Temperature:
 Two films were pressure-bonded to each other by applying a load of 2 kg/cm$^2$ for 2 seconds at a given temperature using a heat-sealer, and the thus obtained 25-mm wide sample was subjected to delamination test at a delaminating speed of 200 mm/min at a delamination angle of 180°. The temperature at which the thus measured delamination resistance was 300 g/25 mm was taken as heat-sealing temperature.
(3) Transparency (haze):
 Measured according to ASTM D1003.
(4) Blocking:
 Test pieces blocked by applying a 40 g/cm$^2$ load for 3 hours at 60° C. were measured by means of a blocking tester made by Shimadzu Seisakusho Ltd.
(5) Stiffness:
 Measured according to ASTM D747.
(6) Freeze Resistance:

40 mmφ test pieces were horizontally fixed at 0° C., and darts of various weights (impact part being of ½ inch R semisphere) were allowed to drop from a definite height to determine the kinetic energy of the dart when 50% of the test pieces were destroyed. The thus obtained energy was divided by the thickness of the test piece, and the resulting value was taken as a measure of low temperature impact strength, i.e., freeze resistance.

Haze, heat-sealing temperature, blocking, and freeze resistance were measured as to films obtained by pelletizing powdery copolymers containing 0.1 wt% of 2,6-di-t-butyl-p-cresol, 0.1 wt% of tetra[methylene-3-(3,5-di-t-butyl-4-hydroxyphenyl)propionate]methane, 0.1 wt% of erusic amide, 0.1 wt% of calcium stearate and 0.1 wt% of SiO$_2$ fine powder, using a pelletizer, and filming them into 30-μ thick films.

EXAMPLE 1

(1) Preparation of catalyst:
 (1) Process I (preparation of a reduction product):
 A 200-liter reaction vessel was purged and filled with argon, and 40 l of dry hexane and 10 l of titanium tetrachloride were introduced thereinto. This solution was kept at −5° C., and a solution comprising 30 l of dry hexane and 23.2 l of ethylaluminum sesquichloride was dropwise added thereto under such conditions that the temperature of the reaction system was maintained at not higher than −3° C. Then, stirring was continued for 2 hours at the same temperature. After the reaction, the mixture was allowed to stand, and the thus formed reduction product was obtained by solid-liquid separation at 0° C., and washed two times with 40 l of hexane. Thus, there was obtained 16 kg of the reduction product.
 (2) Process II:
 The reduction product obtained by process I was slurried with n-decalin to a slurry concentration of 0.2 g/cc and heat-treated at 140° C. for two hours. After the reaction, the supernatant liquid was withdrawn and washed twice with 40 l of hexane to obtain titanium trichloride composition (A).
 (3) Process III:
 11 kg of the titanium trichloride composition prepared according to Process II was slurried with 55 l of toluene, and iodine and diisoamyl ether were introduced thereinto so that the molar ratio of titanium trichloride composition (A)/I$_2$/diisoamyl ether became 1/0.1/1.0. Then, the mixture was reacted for 1 hour at 80° C. to obtain titanium trichloride solid catalyst (B).
(2) Process for producing propylene copolymer:
 A 200-liter (internal volume) polymerization vessel equipped with a stirrer was fully purged and filled with propylene, and 68 l of heptane, 13.6 kg of propylene, and 0.08 kg of ethylene were fed thereto. The temperature of the vessel was raised to 60° C., and propylene, ethylene and hydrogen were fed thereinto so that the pressure became 10 kg/cm$^2$ gage and that the concentrations of ethylene and hydrogen in gas phase became 2.2 mol% and 8 mol%, respectively.
 0.02 mol (3.1 g) of the aforesaid titanium trichloride solid catalyst (B) and 0.7 mol (84.4 g) of diethylaluminum chloride (DEAC) were introduced thereinto and washed with 2 l of heptane to initiate copolymerization. Subsequently, the copolymerization was continued for 8 hours while continuously feeding monomers so as to maintain the temperature, pressure, and gas phase composition at constant levels.

After discontinuation of the copolymerization by introducing butanol thereinto, 70 l of 60° C. heptane introduced diethylaluminum chloride. The results obtained are shown in Table 1.

TABLE 1

| Example/ Comparative | Catalyst Component (A) | DEAC/TiCl3 (molar ratio) | Copolymer Composition *1 | *2 | *3 | HIP (%) | MI (g/min) | Stiffness kg/cm² | Film Properties Haze (%) | Heat-Sealing Temperature (°C.) | Blocking (g/100 cm²) |
|---|---|---|---|---|---|---|---|---|---|---|---|
| 1 | Ex.1, (1) | 35 | 94.8 | 5.2 | — | 93 | 7.7 | 7,200 | 2.9 | 126 | 23 |
| 2 | " | " | 85.8 | — | 14.2 | 85 | 10.0 | 6,900 | 2.5 | 114 | 49 |
| 3 | " | " | 93.5 | 4.4 | 2.1 | 90 | 8.1 | 6,800 | 2.6 | 122 | 46 |
| 4 | " | " | 88.8 | 4.4 | 6.8 | 86 | 6.8 | 6,600 | 2.6 | 118 | 50 |
| 5 | " | 50 | 93.6 | 4.5 | 1.9 | 92 | 7.7 | 7,000 | 2.8 | 124 | 45 |
| C-1 | Ex.1, (1) | 10 | 93.7 | 4.3 | 2.0 | 83 | 6.3 | 6,500 | 2.7 | 126 | 79 |
| C-2 | TiCl3 made by Toho Titanium Co., Ltd. | 35 | 93.5 | 4.4 | 2.1 | 75 | 9.0 | 6,100 | 3.5 | 128 | 90 |
| C-3 | TiCl3 made by Toho Titanium Co., Ltd. | 10 | 93.6 | 4.3 | 2.1 | 80 | 8.3 | 6,500 | 3.1 | 126 | 76 |

*1 Propylene
*2 Ethylene
*3 Butene-1 was added thereinto, followed by stirring for 30 minutes.

Powdery copolymer was separated by means of a centrifuge, and dried to obtain 26.5 kg of powdery copolymer. In addition, the concentration of remaining heptane separated from the powdery copolymer yielded 2.0 kg of non-crystalline polymer.

Weight percentage (HIP %) of the powdery copolymer based on the whole polymers produced was 93%, and the weight of the whole polymers produced per unit weight of the titanium trichloride catalyst component was 9,200 g/g.

Composition and properties of the powdery copolymer are tabulated in Table 1.

EXAMPLE 2

Example 1 was repeated except for introducing butene-1 in an amount calculated to attain the intended copolymer composition in place of ethylene shown in Table 1. The results obtained are shown in Table 1.

EXAMPLE 3

Example 1 was repeated except for introducing ethylene and butene-1 in amounts calculated to attain the intended copolymer composition in place of ethylene shown in Table 1. The results obtained are shown in Table 1.

EXAMPLE 4

Example 3 was repeated except for changing the intended copolymer composition as shown in Table 1. The results obtained are shown in Table 1.

EXAMPLE 5 AND COMPARATIVE EXAMPLE 1

Example 3 was repeated except for changing the amount of diethylaluminum chloride as shown in Table 1. The results obtained are shown in Table 1.

COMPARATIVE EXAMPLES 2 AND 3

Example 3 was repeated except for introducing 10 g of titanium trichloride made by Toho Titanium Co., Ltd., in place of titanium trichloride solid catalyst (B) prepared in Example 1, (1), and changing the amount of

EXAMPLE 6

(1) Preparation of catalyst:

(1) Process I (preparation of β-type titanium trichloride):

A 200-liter reactor was purged and filled with argon, 40 l of dry hexane and 10 l of titanium tetrachloride were introduced thereinto and this solution was kept at −5° C.

Then, a solution comprising 30 l of dry hexane and 116 l of diethylaluminum chloride was added dropwise thereto under such conditions that the temperature of the reaction system was maintained at not higher than −3° C. After completion of the dropwise addition, the mixture was further stirred for 30 minutes and, subsequently, the temperature was raised to 70° C., followed by further stirring for 1 hour.

Thereafter, the reaction mixture was allowed to stand, and β-type titanium trichloride obtained by solid-liquid separation was washed three times with 40 l of hexane to obtain 15 kg of a reduction product. This titanium trichloride contained 4.60 wt% aluminum.

(2) Process II (preparation of Lewis base-treated solid):

β-type titanium trichloride obtained according to above-described process I was suspended in 40 l of dry hexane, and diisoamyl ether was added thereto in an amount 1.2 times (by molar ratio) as much as the β-type titanium trichloride, followed by stirring at 40° C. for 1 hour.

After completion of the reaction, the supernatant liquid was withdrawn, and washed three times with 40 l of hexane and dried.

(3) Process III:

10 kg of the Lewis base-treated solid prepared according to above-described process II was introduced into a solution composed of 30 l of dry heptane and 20 l of titanium tetrachloride to treat at 70° C. for 2 hours.

After the reaction, the supernatant liquid was withdrawn, washed three times with 30 l of hexane, then dried to obtain titanium trichloride solid catalyst (C).

(2) Process for producing propylene copolymer:

A 200-liter (internal volume) polymerization vessel equipped with a stirrer was fully purged and filled with propylene, and 50 kg of propylene and 0.075 kg of ethylene were fed thereinto.

0.013 mol (2.0 g) of aforesaid titanium trichloride solid catalyst (C), 0.54 mol (65 g) of diethylaluminum chloride (DEAC), and 0.02 mol (2.0 g) of methyl methacrylate were introduced into the vessel, and the temperature of the vessel was immediately raised to 60° C. The reaction was continued for 4 hours while feeding the monomers so that the temperature, pressure, and gas phase composition were maintained at definite levels. Additionally, adjustment of molecular weight was attained using hydrogen.

After discontinuation of the copolymerization by adding isobutanol, the slurry was washed twice with 50 kg of liquid phase propylene. Thus, there was obtained 24.2 kg of powdery copolymer. Also, 0.4 kg of non-crystalline polymer dissolved in washing propylene was recovered.

Proportion of the non-crystalline polymer recovered based on the whole copolymers produced was 1.6 wt%, and the amount of whole copolymers produced per unit weight of titanium trichloride was 12,100 g/g-TiCl$_3$. Composition and properties of the resulting powdery copolymer are tabulated in Table 2.

EXAMPLE 7

Example 6 was repeated except for introducing butene-1 in an amount calculated to attain the intended copolymer composition in place of ethylene as shown in Table 2. The results obtained are shown in Table 2.

EXAMPLE 8

Example 6 was repeated except for introducing ethylene and butene-1 in amounts calculated to attain the intended copolymer composition in place of ethylene as shown in Table 2. The results obtained are shown in Table 2.

EXAMPLE 9

Example 8 was repeated except for changing the intended copolymer composition as shown in Table 2. The results obtained are shown in Table 2.

EXAMPLE 10 AND COMPARATIVE EXAMPLE 4

Example 8 was repeated except for changing the amount of the introduced diethylaluminum chloride as shown in Table 2. The results obtained are shown in Table 2.

solid catalyst (B), 1,100 g (9.1 mols)/hr of diethylaluminum chloride (DEAC), and 40 g (0.40 mol)/hr of methyl methacrylate were continuously fed into a 30 m$^3$ polymerization tank in the presence of hydrogen, and copolymerization reaction between ethylene, propylene, and butene-1 was conducted according to a flow method while maintaining the temperature within the tank at 60° C.

Polymerization slurry was continuously withdrawn from the lower part of the tank so as to maintain the liquid level within the tank at a definite level, and fed to the upper part 9 of counter current type multistage contact-washing tower 8 shown in Figure. Isobutanol was fed, as a deactivator, into the tank through center part 17 thereof at the rate of 1 kg/hr.

On the other hand, purified liquid phase propylene kept at 50°-52° C. was continuously fed through the lower part 10 of the tower at the flow rate of 1,100 kg/hr and contents within the tower were stirred at an extremely slow rate of 12 rpm.

Insoluble polymer depositing on the lower part of the tower was continuously withdrawn into flash tank 14 through line 12 via reducing valve 13 interlocked with leveling meter LC. Thus, there was obtained powdery copolymer at the rate of 450 kg/hr.

On the other hand, liquid phase monomers containing materials soluble in the monomers such as a reaction product between the catalyst and isobutanol and soluble non-crystalline polymer were discharged from tower top 11, and introduced into an atactic polymer-recovering apparatus. Thus, non-crystalline polymer was recovered at the rate of 7.3 kg/hr. Loss of fine powdery solid copolymer contained therein was not more than 1%. Proportion of recovered atactic polymer (AP-recovery proportion) based on the whole produced copolymers was 1.6%.

Additionally, the counter current washing tower used here had a tower diameter of 600 mm$\phi$ and a tower height of 8,200 mm and contained 10-stage cone-shaped rotary plates.

Ash contents in the powdery copolymer washed in the washing step and recovered by the flash tank were extremely small as follows: total ash content: 50 ppm; TiO$_2$: 34 ppm; and Al$_2$O$_3$: 10 ppm. Also, the volatile content was as small as 20 ppm.

The thus obtained powdery copolymer was a white clean powder and caused no problems of foaming, corrosion, etc., upon pelletizing and filming. Composition and properties of this copolymer are shown in Table 3.

TABLE 2

| Example/ Comparative | DEAC/ TiCl$_3$ (molar ratio) | Copolymer Composition | | | *4 | MI (g/10 min) | Stiffness (kg/cm$^2$) | Physical Properties of Films | | |
|---|---|---|---|---|---|---|---|---|---|---|
| | | *1 | *2 | *3 | | | | Haze (%) | Heat-Sealing Temperature (°C.) | Blocking (g/100 cm$^2$) |
| 6 | 41.5 | 95.9 | 4.1 | — | 1.6 | 8.1 | 8,200 | 2.8 | 129 | 21 |
| 7 | " | 88.5 | — | 11.5 | 3.0 | 11.3 | 7,300 | 3.1 | 118 | 43 |
| 8 | " | 94.1 | 3.1 | 2.8 | 2.3 | 6.6 | 8,100 | 3.4 | 125 | 39 |
| 9 | " | 89.6 | 3.0 | 7.4 | 3.1 | 8.5 | 7,100 | 3.0 | 120 | 48 |
| 10 | 63.8 | 94.0 | 3.1 | 2.9 | 2.1 | 8.0 | 8,300 | 3.3 | 124 | 35 |
| C-4 | 10.2 | 93.9 | 3.0 | 3.1 | 3.3 | 6.3 | 7,400 | 3.7 | 128 | 74 |

*1 Propylene
*2 Ethylene
*3 Butene-1
*4 Proportion of recovered AP (%)

EXAMPLE 11

900 kg/hr of liquid propylene, 11 kg/hr of ethylene, 80 kg/hr of butene-1, 40 g (0.26 mol)/hr of foregoing

EXAMPLE 12 AND COMPARATIVE EXAMPLE 5

Example 11 was repeated except for changing the amount of DEAC as shown in Table 3. The results obtained are shown in Table 3. It is seen that a molar ratio of DEAC/TiCl$_3$ of less than 20 resulted in an increase of the proportion of recovered AP and serious deterioration of the properties of the copolymer, particularly blocking properties.

COMPARATIVE EXAMPLES 6 and 7

Example 11 was repeated except for feeding TiCl$_3$AA made by Toho Titanium Co., Ltd. at the rate of 160 g/hr in place of solid catalyst (B) prepared in Example 1, (1), and changing the amount of DEAC as shown in Table 3. The proportion of recovered AP seriously increased, and loss of fine powdery solid copolymer contained therein increased to 3-4%. Ash contents in the resulting powdery copolymers were as large as shown below.

|  | Total Ash Content (ppm) | TiO$_2$ (ppm) | Al$_2$O$_3$ (ppm) |
|---|---|---|---|
| Comparative Example 6 | 196 | 148 | 42 |
| Comparative Example 7 | 150 | 125 | 16 |

The copolymers were yellow-colored powders. Compositions and properties of the thus obtained copolymers are shown in Table 3. The results show that transparency, stiffness, heat-sealing properties, and blocking properties were deteriorated, with blocking properties being particularly seriously deteriorated. Thus, the copolymers possessed poor commercial values. Table 3 also shows that this catalyst failed to provide the effects of the present invention even when the molar ratio of DEAC/TiCl$_3$ was made 20-100.

EXAMPLES 13 AND 14

Example 11 was repeated except for using solid catalyst (C) in place of solid catalyst (B) and changing the intended copolymer composition as shown in Table 3. The results obtained are shown in Table 3.

TABLE 3

| Example/ Comparative | DEAC/ TiCl$_3$ (molar ratio) | Copolymer Composition *1 | *2 | *3 | MI (g/10 min) | Stiffness (kg/cm$^2$) | Haze (%) | Heat-Sealing Temperature (°C.) | Blocking (g/100 cm$^2$) | Freeze Resistance (kg-cm/mm) |
|---|---|---|---|---|---|---|---|---|---|---|
| 11 | 35.0 | 2.2 | 3.8 | 1.6 | 7.0 | 8,500 | 3.3 | 124 | 37 | 18 |
| 12 | 60.6 | 2.1 | 3.8 | 1.5 | 7.3 | 8,600 | 3.2 | 124 | 35 | 17 |
| 13 | 35.0 | 3.5 | 2.6 | 2.2 | 7.1 | 7,300 | 3.7 | 123 | 52 | 20 |
| 14 | 35.0 | 1.4 | 8.8 | 2.4 | 7.9 | 7,800 | 3.6 | 118 | 49 | 16 |
| C-5 | 9.6 | 2.1 | 3.8 | 3.1 | 7.7 | 8,100 | 4.0 | 127 | 70 | 18 |
| C-6 | 35.0 | 2.3 | 3.7 | 6.7 | 7.4 | 7,800 | 4.8 | 129 | 110 | 18 |
| C-7 | 9.6 | 2.2 | 3.8 | 6.2 | 7.3 | 8,200 | 4.2 | 127 | 86 | 17 |

*1 Ethylene (wt %)
*2 Butene-1 (wt %)
*3 Proportion of recovered AP (wt %)

While the invention has been described in detail and with reference to specific embodiments thereof, it will be apparent to one skilled in the art that various changes and modifications can be made therein without departing from the spirit and scope thereof.

What is claimed is:

1. In a process for producing propylene copolymer containing about 85 to 97.5 mol % propylene and about 2.5 to 15 mol % ethylene and/or an α-olefin having 4-18 carbon atoms using a Ziegler-Natta catalyst, the improvement which comprises said Ziegler-Natta catalyst comprising:

[A] titanium trichloride prepared by reducing titanium tetrachloride with an organoaluminum compound represented by the formula:

$$AlR_lX_{3-l}$$ 

wherein R represents a straight chain, branched chain or cyclic alkyl group or aryl group having up to 18 carbon atoms and X represents a halogen atom or a hydrogen atom and l is a number $1 \leq l \leq 3$, and reacting the reduced solid with an ether and a halogen compound simultaneously or successively, wherein said ether is an ether represented by the formula:

$$R^1-O-R^2$$

wherein $R^1$ and $R^2$ are each a straight chain, branched chain or cyclid alkyl group having 1 to 10 carbon atoms, and said halogen compound is selected from the group consisting of (i) halogen or interhalogen compounds of the formula:

$$X^1X^2_a$$ 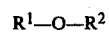

wherein $X^1$ and $X^2$ are each a chlorine, bromine or iodine atom and a is a number from 1 to 3;
(ii) titanium halides; and
(iii) organic halogen compounds, and

[B] an organoaluminum compound represented by the formula:

$$AlR^4_{3-m}X^4_m$$ 

wherein $R^4$ is an alkyl group having 1 to 18 carbon atoms, $X^4$ is a hydrogen, chlorine, bromine or iodine atom or an alkoxy group having 1 to 8 carbon atoms and m is a number satisfying the relation $0 \leq m \leq 3$: with the molar ratio of [B]/[A] being about 30 to 70.

2. The process of claim 1, wherein said propylene copolymer is propylene-ethylene copolymer.

3. The process of claim 1, wherein said propylene copolymer is propylene-butene-1 copolymer.

4. The process of claim 1, wherein said propylene copolymer is propylene-ethylene-butene-1 copolymer.

5. The process of claim 1, wherein polymerization is conducted in an inert organic solvent.

6. The process of claim 1, wherein polymerization is conducted in liquid phase monomers containing substantially no solvent.

7. The process of claim 1, wherein said copolymer is produced in an amount of about 8,000 parts by weight or more per part by weight of catalyst component (A).

8. The process of claim 1, wherein said process comprises polymerizing said comonomers in a liquid phase medium having a solubility parameter of not more than 7.0 (cal/cc)$^{\frac{1}{2}}$ and introducing the polymer slurry into a counter current washing tower through an upper portion thereof and washing by contacting with a liquid phase medium having a solubility parameter of not more than about 7.0 (cal/cc)$^{\frac{1}{2}}$ in a counter current manner.

9. The process of claim 1, wherein said organoaluminum compound used in (A) to reduce titanium tetrachloride is selected from the group consisting of methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide and diethyl aluminum iodide.

10. The process of claim 1, wherein component (B) is selected from the group consisting of dimethylaluminum chloride, diethylaluminum chloride, diisobutylaluminum chloride, diethylaluminum bromide, diethylaluminum iodide, ethylaluminum sesquichloride, a mixture of triethylaluminum and diethylaluminum, a mixture of triethylaluminum and aluminum chloride.

11. The process of claim 1, wherein said catalyst additionally comprises an electron donor.

* * * * *